United States Patent Office 3,300,520
Patented Jan. 24, 1967

3,300,520
2-HYDROXY-METHYLENE-7α-METHYL ANDROSTANES
Georg Anner and Jaroslav Kalvoda, Basel, Switzerland, assignors to Ciba Corporation, New York, N.Y., a corporation of Delaware
No Drawing. Filed June 4, 1964, Ser. No. 372,667
Claims priority, application Switzerland, July 5, 1963, 8,425/63
5 Claims. (Cl. 260—397.4)

The present invention provides a process for the manufacture of new methylandrostanes of the formula

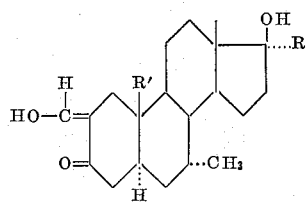

where R represents a lower aliphatic hydrocarbon radical and R' a hydrogen atom or a methyl group—of their esters and, if desired, salts of these compounds.

The aliphatic hydrocarbon radical R is preferably a lower alkyl, more especially methyl or, for example, ethyl, propyl or isopropyl, or lower alkenyl or alkinyl, such as vinyl, allyl, methallyl, ethinyl or propargyl.

Esters of the new methylandrostanes are, for example, monoesters or diesters of organic carboxylic or sulphonic acids, more especially such acids as contain up to 18 carbon atoms, for example formates, acetates, propionates, butyrates, valerates, trimethylacetates, caproates, undecylenates, cyclohexanecarboxylates, cyclopentylpropionates, phenylacetates, phenoxyacetates, benzoates, furoates or methanesulphonates, ethanesulphonates, benzenesulphonates or toluenesulphonates.

When the new methylandrostanes contain a free 2-hydroxy-methylene group, they can form salts with bases. There may be mentioned especially alkali metal or alkaline earth metal salts, for example the salts of sodium, potassium and calcium.

The new compounds possess valuable pharmacological properties, more especially anabolic properties. Thus, for example, when tested on rats they display a very favourable quotient of the anabolic to the androgenic action. They may, therefore, be used as anabolics, for example for the treatment of post-infectious or post-operative deficiency symptoms, for treating chronic loss of weight, anorexia or osteoporosis. They are also valuable intermediates for the manufacture of further substances, especially those that can be used pharmacologically.

The new compounds can be manufactured by known methods; advantageously a compound of the formula

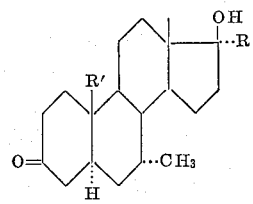

where R and R' have the above meanings—or a 17-ester thereof—is reacted with a formic acid ester in the presence of a basic agent and, if desired, a resulting salt and/or ester is converted into the free compound or a free compound is converted into an ester and/or salt thereof.

Particularly suitable formic acid esters are lower aliphatic formates, such as methyl or ethyl formate. It is of advantage to use as the basic agent an alkali metal, such as lithium, sodium or potassium, or a compound of basic reaction thereof, more especially a hydride or an amide or alcoholate thereof.

The process of the invention is advantageously performed by dissolving the starting material in an iner solvent, for example in an ether such as diethyl ether tetrahydrofuran or dioxane, or in a hydrocarbon such as benzene, whereupon an excess of ethyl formate and sodium hydride is added, and the solution is stirred for 10 to 24 hours under nitrogen at room temperature. Alternatively, the reaction can be performed at an elevated temperature, for example ranging from 20 to 80° C., for which less time is needed.

As a rule, the resulting product is the salt of the base used as condensing agent, and this salt can be converted into the free compound by treatment with an acidic hydrolysing agent, for example an aqueous inorganic or organic acid, such as hydrochloric, sulphuric or acetic acid. When the product of the process is an ester, i can be hydrolysed in the known manner, for example by basic hydrolysis or by hydrogenolysis. A resulting free compound can be esterified in the known manner, for example by reaction with a reactive functional derivative, such as an anhydride or chloride, of an acid, and/or converted into a salt with bases.

The invention includes also any modification of the present process in which an intermediate obtained at any stage of the process is used as starting material and any remaining steps are carried out or the process is discontinued at any stage thereof, or the starting materials are formed under the reaction conditions.

The starting materials can be prepared, for example from the corresponding $\Delta^4$-3-oxo-7α-methylandrostenes or -19-norandrostenes by treatment with lithium or sodium in liquid ammonia. Alternatively, they can also be prepared by introducing in the known manner a lower aliphatic hydrocarbon residue in the 17α-position of 3:17-dioxo-7α-methyl-5α-androstane or -19-nor-androstane, if desired with transient protection of the 3-oxo group.

The new compounds can be used as medicaments, for example in the form of pharmaceutical preparations containing them or their salts in admixture or conjunction with an organic or inorganic, solid or liquid pharmaceutical excipient suitable for enteral, parenteral or local administration. Suitable excipients are substances that do not react with the new compounds, for example water gelatine, lactose, starches, magnesium stearate, talcum vegetable oils, benzyl alcohols, gums, polyalkyleneglycols white petroleum jelly, cholesterol or other known medicinal excipients. The permaceutical preparations may be for example, tablets, dragees, ointments or creams, or ir liquid form solutions, suspensions or emulsions. They may be sterilised and/or contain assistants such as preservatives, stabilisers, wetting agents or emulsifiers, salts for regulating the osmotic pressure or buffers. They may also contain further therapeutically valuable substances The preparations, which may also be used in veterinary medicine, are formulated in the usual manner.

The following examples illustrate the invention without restricting its scope thereto.

EXAMPLE 1

A solution of 2.0 g. of 3-oxo-7α:17α-dimethyl-17β-hydroxy-5α-androstane in 80 ml. of absolute benzene is mixed with 4.5 ml. of ethyl formate and 2.5 g. of a 50% suspension of sodium hydride in oil, and the whole is stirred for 15 hours under nitrogen. The precipitated sodium salt is filtered off and exhaustively washed with ether. The dry, yellow compound is then vigorously shaken in a separating funnel with 100 ml. of 2 N hydrochloric acid and 300 ml. of ether with the addition of about 50 g. of ice, whereupon the liberated hydroxymethylene compound gradually dissolves in the ether. The organic layer is successively washed with water, with a mixture of 30 ml. of saturated sodium bicarbonate solution and with 170 ml. of ice water and then twice more with water. The ethereal solution is dried with sodium sulphate and evaporated in a water-jet vacuum, to yield 2.1 g. of a yellowish foam which, on recrystallisation from methylene chloride+ether, yields 1.28 g. of pure 2-hydroxymethylene-3-oxo-7α:17α-diamethyl - 17β-hydroxy-5α-androstane melting at 160–162° C. (When a specimen is rapidly heated in a melting-point apparatus, it melts at 134–136° C., solidifies again and melts once more at 158–160° C.). Infrared spectrum: bands inter alia at 2.81, 6.10, 6.28, 8.40, 8.70, 9.00, 10.35 and 10.68μ and $\lambda_{max}$=316 mμ; ε=17500 (solvent: ethanol+sodium hydroxide solution). Ferric chloride test: positive.

EXAMPLE 2

A solution of 2.0 g. of 3-oxo-7α.17α-dimethyl-17β-hydroxy-5α-19-nor-androstane in 80 ml. of benzene and 4.0 ml. of ethyl formate is mixed with 2.4 g. of a 50% suspension of sodium hydride in oil and the whole stirred for 15 hours at 20° C. while passing dry nitrogen through it. The reaction mixture is diluted with ether, filtered, the residue washed with ether, suspended in ether and the suspension shaken with 80 ml. of ice cold 2 N hydrochloric acid until dissolution occurs. The ethereal layer is washed with cold, diluted sodium becarbonate solution and water until neutral, dried and evaporated in a water-jet vacuum. The crude product obtained (2.10 g.) yields on recrystallization from methylene chloride+ether+petroleum ether 1.12 g. pure 2-hydroxymethylene-3-oxo-7α:17α-dimethyl-17β-hydroxy-5α-19-norandrostane M.P. 205–207° C. From the mother liquor there can be obtained another 0.41 g. of that product.

What is claimed is:
1. Methyl-androstanes of the formula

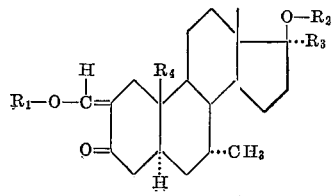

in which $R_1$ represents a member selected from the group consisting of hydrogen, an alkali metal, an alkaline earth metal, the acyl group of a carboxylic acid with up to 18 carbon atoms and the acyl group of a sulfonic acid with up to 18 carbon atoms, $R_2$ represents a member selected from the group consisting of hydrogen, the acyl group of a carboxylic acid with up to 18 carbon atoms and the acyl group of a sulfonic acid with up to 18 carbon atoms, $R_3$ represents a member selected from the group consisting of lower alkyl, lower alkenyl and lower alkynyl and $R_4$ represents a member selected from the group consisting of hydrogen and methyl.

2. A member selected from the group consisting of 2-hydroxymethylene-3-oxo-7α-methyl-17α-lower alkyl - 17β-hydroxy-5α-androstane, the monoesters and diesters thereof which are derived from a member selected from the group consisting of a carboxylic acid with up to 18 carbon atoms and a sulfonic acid with up to 18 carbon atoms, the alkali metal salts and the alkaline earth metal salts of said compounds having a free 2-hydroxymethylene group.

3. A member selected from the group consisting of 2-hydroxymethylene-3-oxo-7α-methyl-17α-lower alkyl - 17β-hydroxy-5α-19-nor-androstane, the monoesters and diesters thereof which are derived from a member selected from the group consisting of a carboxylic acid with up to 18 carbon atoms and a sulfonic acid with up to 18 carbon atoms, the alkali metal salts and the alkaline earth metal salts of said compounds having a free 2-hydroxymethylene group.

4. 2-hydroxymethylene - 3 - oxo-7α:17α-dimethyl-17β-hydroxy-5α-androstane.

5. 2-hydroxymethylene - 3 - oxo-7α:17α-dimethyl-17β-hydroxy-5α-19-nor-androstane.

References Cited by the Examiner
UNITED STATES PATENTS
3,132,137   5/1964   Clinton _____ 260—239.5

OTHER REFERENCES
Campbell et al., "Steroids," No. 1, page 317 relied on.

LEWIS GOTTS, *Primary Examiner.*
ELBERT ROBERTS, *Examiner.*